(12) United States Patent
Bishop et al.

(10) Patent No.: US 7,496,232 B2
(45) Date of Patent: Feb. 24, 2009

(54) DISTINGUISHING TEXT FROM NON-TEXT IN DIGITAL INK

(75) Inventors: Christopher M. Bishop, Cambridge (GB); Johan Fredrik Markus Svensen, Cambridge (GB); Geoffrey Hinton, Toronto (CA)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 10/874,854

(22) Filed: Jun. 23, 2004

(65) Prior Publication Data

US 2005/0286771 A1     Dec. 29, 2005

(51) Int. Cl.
G06K 9/46     (2006.01)

(52) U.S. Cl. .............. 382/202; 382/228; 345/173; 178/18.03; 434/162

(58) Field of Classification Search ............ 382/187, 382/202, 186, 230, 189, 159, 203, 200, 309, 382/188, 179, 228, 181, 178, 226; 345/179, 345/173, 156, 182; 715/541, 863, 530, 531, 715/526, 901, 500.1; 341/5, 33; 178/18.03, 178/18.01; 434/156, 159, 161, 162, 165

See application file for complete search history.

(56) References Cited

U.S. PATENT DOCUMENTS

| | | | | |
|---|---|---|---|---|
| 5,333,209 A * | 7/1994 | Sinden et al. | ............... | 382/187 |
| 5,559,897 A * | 9/1996 | Brown et al. | ............... | 382/186 |
| 5,878,164 A * | 3/1999 | Brown et al. | ............... | 382/190 |
| 5,940,532 A * | 8/1999 | Tanaka | ...................... | 382/185 |
| 5,946,410 A * | 8/1999 | Lyon | .......................... | 382/157 |
| 6,671,395 B1 * | 12/2003 | Ott et al. | ..................... | 382/137 |
| 6,671,417 B1 * | 12/2003 | Koshinaka | .................. | 382/254 |
| 6,970,601 B1 * | 11/2005 | Kaneda et al. | ............. | 382/209 |
| 2003/0215145 A1 * | 11/2003 | Shilman et al. | ............ | 382/195 |
| 2004/0165774 A1 * | 8/2004 | Koubaroulis et al. | ........ | 382/179 |

\* cited by examiner

Primary Examiner—Sheela C Chawan

(57) ABSTRACT

A discriminative machine learning system for labels text and non-text strokes in digital ink. The learning system considers stroke features and the context of the strokes, such as temporal information about one or more strokes, in a probabilistic framework. The learning system can also consider gap features within the probabilistic framework to label associated strokes.

22 Claims, 10 Drawing Sheets

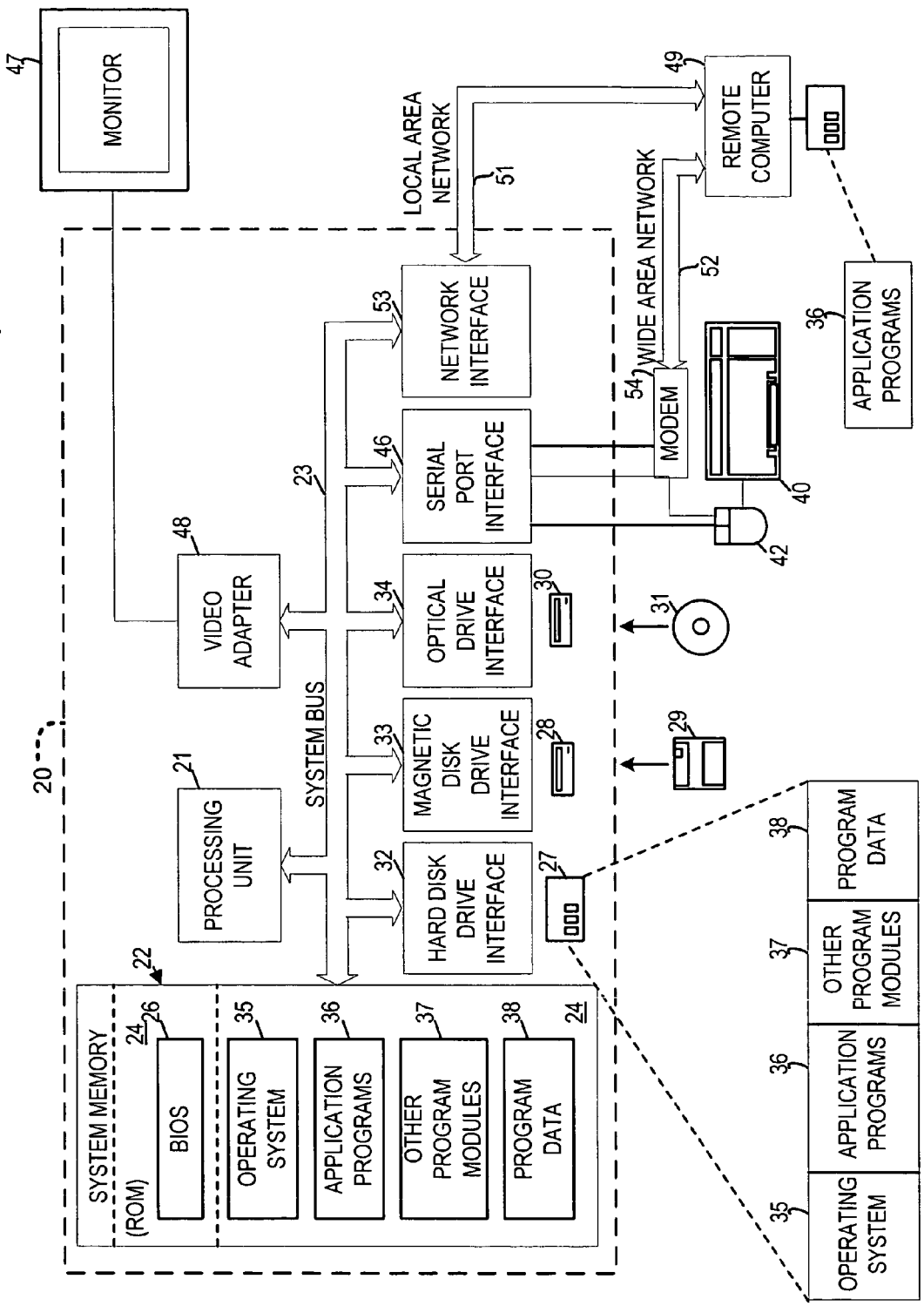

DISTINGUISHING TEXT FROM NON-TEXT IN DIGITAL INK

TECHNICAL FIELD

The invention relates generally to pattern recognition, and more particularly to distinguishing between text strokes and non-text strokes in digital ink.

BACKGROUND

Pen-controlled computing devices, such as Personal Digital Assistants (PDAs) and tablet computers, are finding increased commercial relevance. Such devices typically replace or supplement a traditional mouse and keyboard with a pen that serves both as a pointing device and as a device for entering "digital ink". In many applications, the digital ink can represent both text and non-text data. For example, a user may use the pen to enter text, to draw sketches, and to indicate editing commands (e.g., deleting a text word by simply crossing out the word with the pen).

Some features extracted from an individual pen stroke provide some relevant information regarding the classification of the stroke as text or non-text (e.g., a full page circle may be considered a graphic circle, instead of a text 'O'), so some limited separation between text and non-text data may be obtained. However, existing approaches tend to attempt such limited classification when the stroke is initially entered and do not adapt their initial classification as additional data context is received from the pen. Therefore, more subtle distinctions between text and non-text are not available in existing approaches. Accordingly, the accuracy and extent of existing approaches in distinguishing between the different data input modes of a pen (e.g., text and non-text) is inadequate.

SUMMARY

Implementations described and claimed herein address the foregoing problems by providing a discriminative machine learning system for separating text and non-text strokes in handwritten digital ink. The learning system considers stroke features and the context of the strokes, such as temporal information about multiple strokes, in a probabilistic framework. Furthermore, as the classification can adapt as additional feature data and context data are received, processing can be deferred to later stages of the computing session. The learning system can also consider gap features within the probabilistic framework to label associated strokes.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTION OF THE DRAWINGS

FIG. 10 illustrates an exemplary system useful in implementations of the described technology.

DETAILED DESCRIPTIONS

Figure 1:
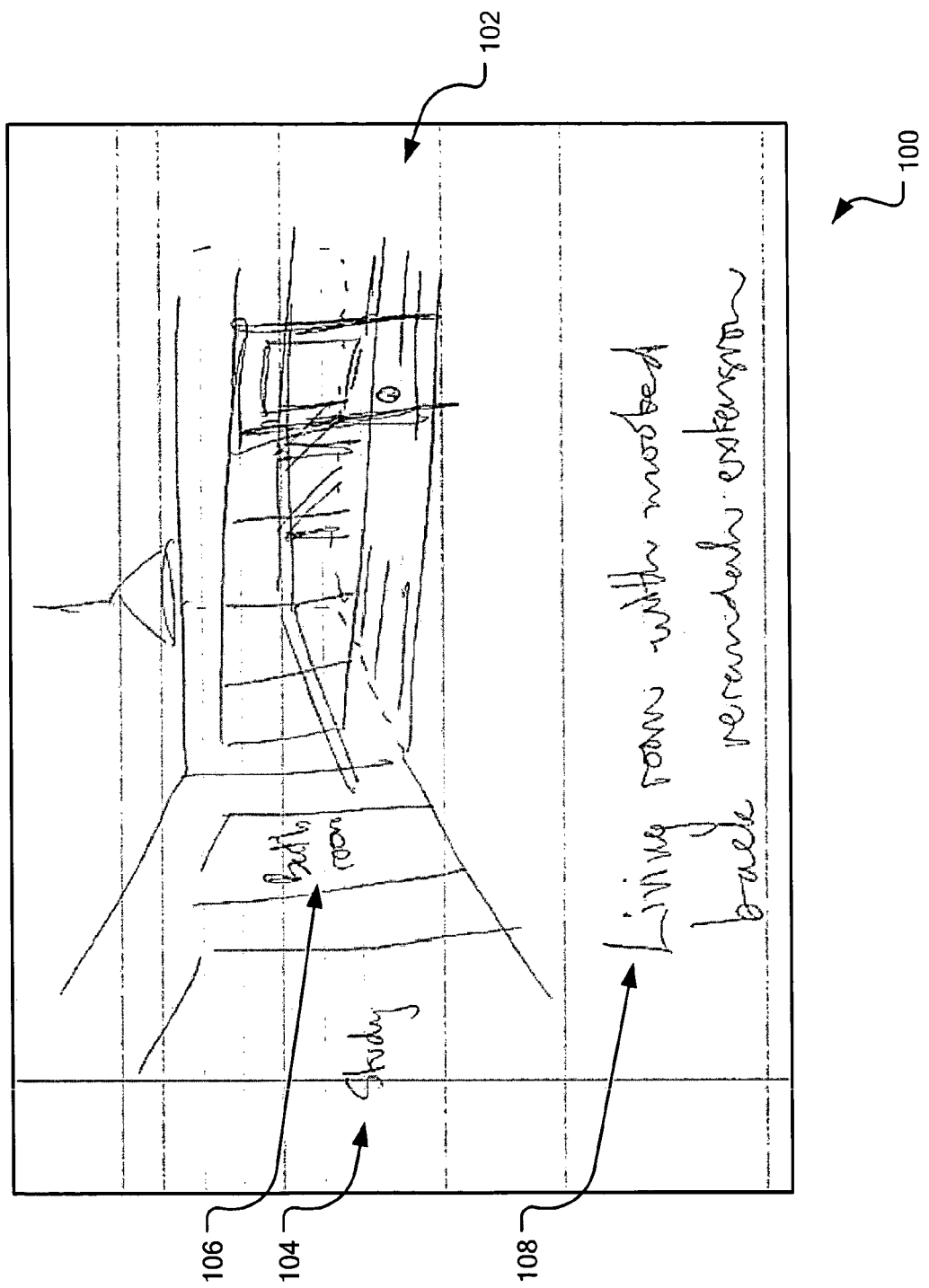
FIG. 1 illustrates a screen shot depicting both text and non-text pen strokes.

FIG. 1 illustrates a screen shot 100 depicting both text and non-text pen strokes. A user has drawn a sketch 102 (e.g., non-text) of a living room with a veranda extension, and written descriptive text 104 ("Study"), 106 ("Bath Room"), and 108 ("Living room with nooked back veranda extension") to annotate the sketch. Without any separation between text and non-text strokes, all strokes would be unlabeled (or labeled the same). However, using the technology described herein, the strokes of the sketch 102 may be designated as non-text strokes, and the strokes of the descriptive text 104, 106, and 108 may be designated as text strokes.

Such distinctions may enable context-sensitive operations on individual strokes. For example, selection of a text stroke may allow access to a spelling facility, whereas that facility may not be available for a non-text stroke.

Figure 2:
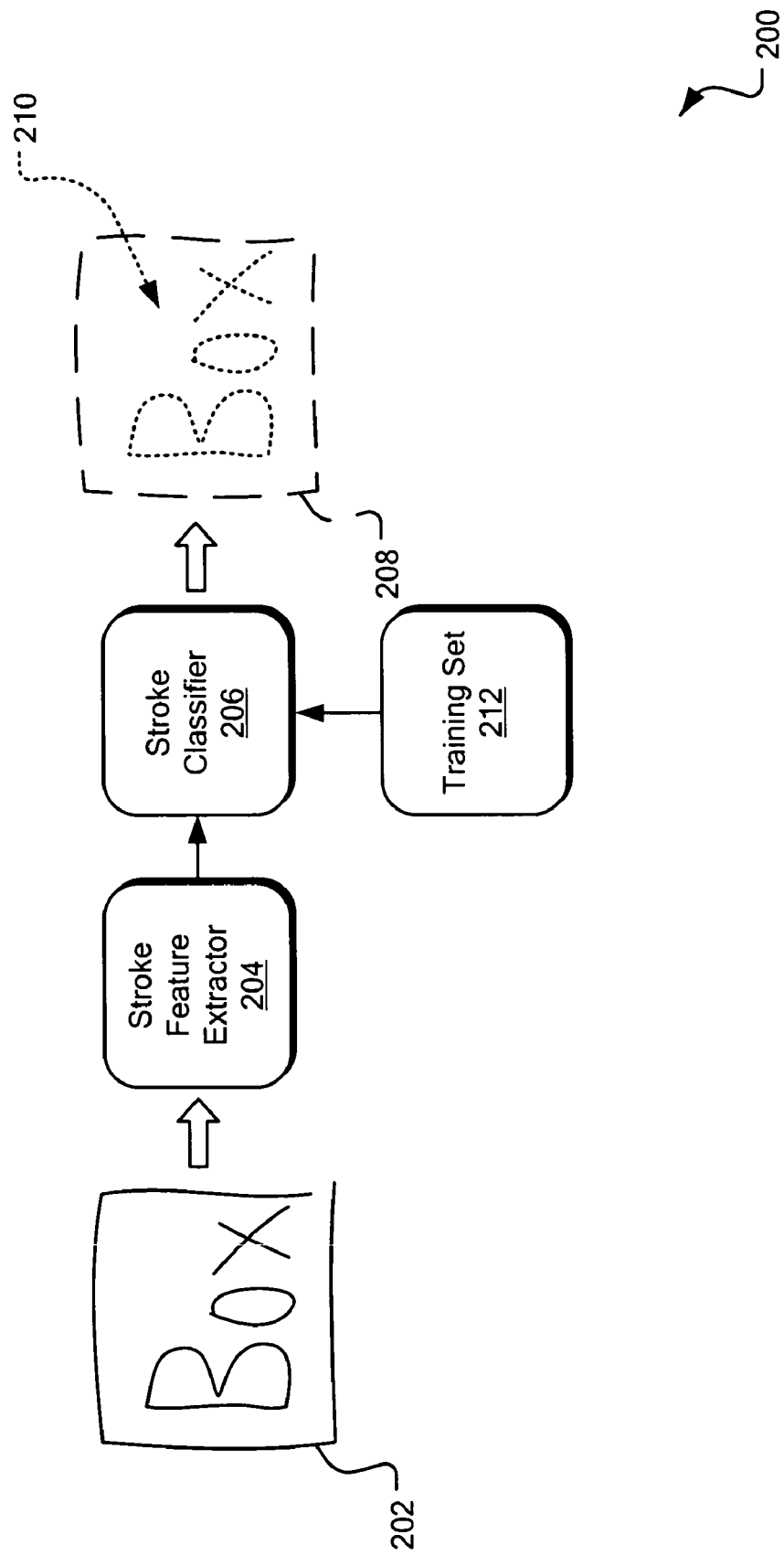
FIG. 2 illustrates an exemplary system for distinguishing between a text stroke and a non-text stroke using one or more features of an individual stroke.

FIG. 2 illustrates an exemplary system 200 for distinguishing between a text stroke and a non-text stroke using one or more features of an individual stroke. A group of input strokes 202 is input to the computing system. The input data for the computing system consists of a sequence of strokes, separated by gaps. A stroke may be represented by a sequences of points (e.g., x-y coordinates) recorded between a pen-down event (e.g., a detection of when the pen was put into contact with the screen) and a pen-up event (e.g., a detection of when the pen was lifted from the screen). The line between two consecutive points of a stroke is termed a "segment". In addition to spatial data, each stroke has a time stamp indicating the pen-down time (and/or some other event associated with the stroke, such as pen-up time, segment times, etc.). Therefore, the temporal ordering of the strokes may be determined.

A stroke extractor module 204 detects individual strokes and extracts one or more real-valued features from each stroke. In one implementation, certain features may be extracted directly from the stroke data itself, including without limitation:

1. the stroke arc length—the sum of the lengths of the stroke segments; and
2. the total absolute curvature—the sum of absolute angles between the consecutive segments;

In addition, a total least squares (TLS) model may be fitted to the stroke to extract additional features. The TLS model is similar to applying a principal component analysis to the set of stroke points and primarily extracts:

3. direction of the stroke, as given by the TLS fit; and
4. eigenvalue (length-width) ratio of the TLS fit.

The stroke may also be divided into fragments at points corresponding to local maxima in the stroke curvature and the TLS model may be applied again to the largest resulting fragment to provide additional features:

5. the total number of fragments in the stroke;
6. the arc length of the largest fragment of the stroke;
7. the total absolute curvature of the largest fragment of the stroke;
8. the primary direction of the largest fragment; and
9. the length of the long side of the bounding rectangle (not axis-aligned) of the largest fragment.

A complete feature vector for an individual vector is represented by x. In one implementation, features 1, 6, and 9 tend to be affected by the overall scale of the text or sketches on the page and therefore are normalized on a per page basis by scaling them with the inverse of the median fragment length.

The direction features 3 and 8 are transformed to the auxiliary features $$u = \sin(\theta) \text{ and } v = \cos(\theta), \text{ where } \theta = 2\arctan\left(\frac{y}{|x|}\right)$$

The transformation removes the directional symmetries around the origin and ensures that the two extremes (corresponding to angles $-\pi/2$ and $\pi/2$) map to identical feature values.

The features 6-9 are motivated by the assumption that a largest fragment is very large (e.g., it may include the entire stroke) and uses a high length-to-width TLS ratio as an indicator that the stroke is more likely to be a non-text stroke.

A stroke classifier module 206 has access a training set 212 of N ordered strokes with feature vectors $x_n$, where n=1, ..., N, and class labels $t_n=\{0,1\}$, where $t_n=1$ denotes a text stoke and $t_n=0$ denotes a non-text stroke. Based on the training set 212, the stroke classifier module 206 generates a classification model used to classify the individual strokes. For example, in one implementation, a logistic regression (LR) model is generated using the scaled conjugate gradients optimization algorithm. In another implementation, a multilayer perceptron (MLP) model is generated using the scaled conjugate gradients optimization algorithm. Other models may also be generated using other algorithms.

The output $y_n=y(x_n)$ of the resulting model represents the probability $p(t_n=1|x_n)$ of a stroke being text given the feature vector $x_n$. The probability distribution of $t_n$ is then given by $p(t_n|x_n)=y_n^{t_n}(1-y_n)^{1-t_n}$.

Given the probability distribution of $t_n$, an exemplary error function for classification is a cross-entropy error, which in the binary case is defined as $$E = -\sum_{n=1}^{N}(t_n \ln y_n + (1-t_n)\ln(1-y_n))$$

Minimizing the error function E corresponds to maximizing the log likelihood function, which can be represented by the modified error function:

$$\tilde{E} = -\sum_{n=1}^{N}\left(\frac{1}{\pi_T}t_n \ln y_n + \frac{1}{\pi_{NT}}(1-t_n)\ln(1-y_n)\right)$$

where $\pi_T$ and $\pi_{NT}$ represent the estimated a-priori probabilities of text and non-text strokes, respectively, in the stroke population of the training set 212. This scaling corresponds to a balanced data set. The stroke classifier module 206 compensates for the scaling (when the trained model is used for prediction) using Bayes' theorem so that $$\tilde{y}_n = \frac{\pi_T y_n}{\pi_T y_n + \pi_{NT}(1-y_n)} \quad (1)$$

where $\tilde{y}_n$ denotes the corrected prediction and represents the posterior probability that the particular stroke is "text" in the context of the real-world imbalanced priors.

Given the corrected prediction $\tilde{y}_n$ for a stroke, a decision may then be made to classify the stroke as text or non-text. For example, if $\tilde{y}_n > 0.5$, the stroke may be designated as text and if $\tilde{y}_n < 0.5$, the stroke may be designated as non-text. In the illustrated example, the stroke 208 is designated as a non-text stroke, whereas the strokes 210 are designated as text. Other more sophisticated decision algorithms may be employed to determine the resulting designation from the corrected prediction $\tilde{y}_n$.

Figure 3:
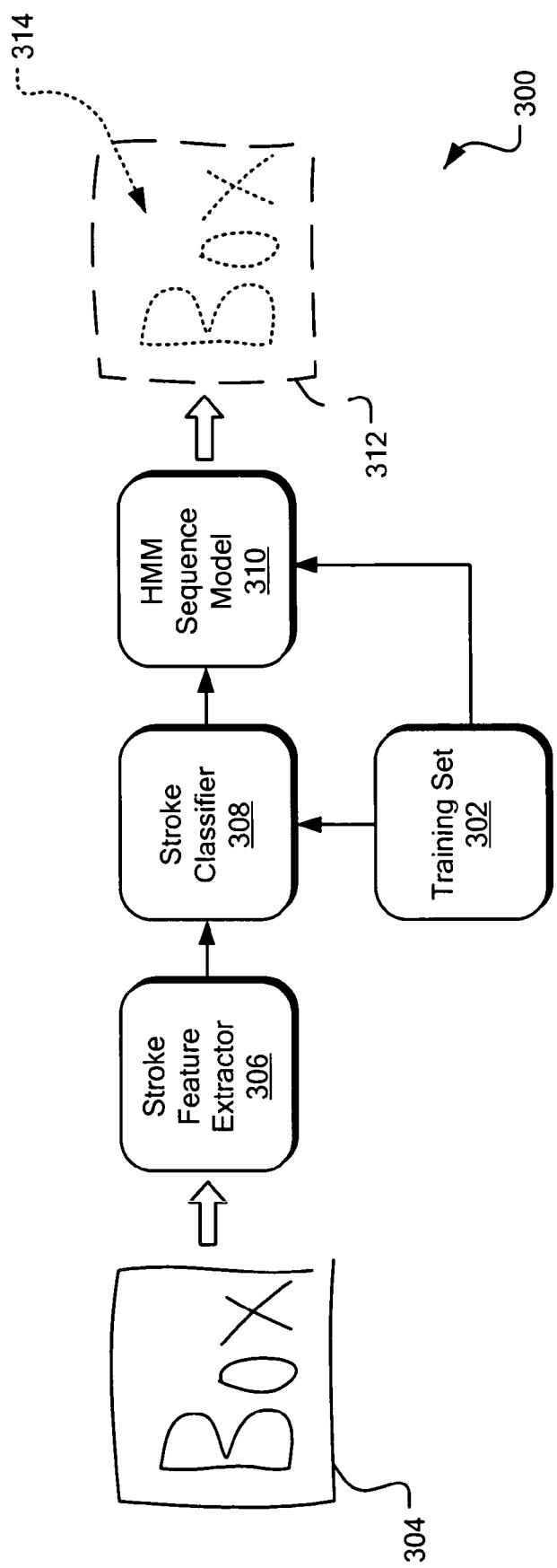
FIG. 3 illustrates an exemplary system for distinguishing between a text stroke and a non-text stroke using temporal context.

FIG. 3 illustrates an exemplary system 300 for distinguishing between a text stroke and a non-text stroke using temporal context. As discussed with regard to FIG. 2, the features of individual strokes treated in isolation can provide useful separation of text strokes from non-text strokes. Notwithstanding, improved accuracy can be achieved by considering the context (e.g., temporal context, spatial context) of each stroke relative to other strokes on the page. Particularly, the use of the temporal context leads to a one-dimensional inference problem, which can be solved efficiently using dynamic programming techniques.

The identity of successive strokes tend to be correlated, as a user will typically make several non-text strokes in succession in order to draw a diagram or will make multiple text strokes in succession while writing a line of text. This observation is described by the transition probability $p(t_n|t_{n-1})$. Given a training set 302 comprising of pages of ink in which each stroke has been labeled as text or non-text, the transition probability $p(t_n|t_{n-1})$ may be determined by measuring the frequencies of text and non-text given the label (i.e., the text/non-text designation) of the previous stroke. Exemplary data from a sample training set is shown by Table 1 below:

TABLE 1

|  | $t_{n-1}=1$ | $t_{n-1}=0$ |
| --- | --- | --- |
| $t_n=1$ | 0.9530 | 0.1638 |
| $t_n=0$ | 0.0470 | 0.8362 |

It can be seen from Table 1 that a strong correlation between labels of successive strokes does exist in the sample training set. The marginal distribution for the first stroke is also recorded, which for the sample training set is $p(t_1=1)=0.5467$.

Two sources of information regarding the identity of the strokes have been described: (1) the predictive distribution $p(t_n|x_n)$ of the classification model described with regard to FIG. 2; and (2) the transition probability $p(t_n|t_{n-1})$. In the illustrated implementation, both the predictive distribution and the transition probability have been "learned" separately from the training set 202. These sources may be combined to obtain an overall posterior probability for the class label. As this involves the conditional probability of a stroke label given only the previous stroke label, a first-order Markov process over the labels is employed.

As in FIG. 2, a group of input strokes 304 are input to the computing system, typically through a digital ink application. A stroke extractor module 306 extracts one or more real-valued features from each stroke. A stroke classifier module 308 has access the training set 302 of N ordered strokes with feature vectors $x_n$, where n=1, ..., N, and class labels $t_n=\{0,1\}$, where $t_n=1$ denotes a text stoke and $t_n=0$ denotes a non-text stroke. Based on the training set 302, the stroke classifier module 308 generates a classification model used to classify the individual strokes. The stroke classifier 308 generates the predictive distribution $p(t_n|x_n)$ of the classification model. The sequence model 310 extracts transition probability $p(t_n|t_{n-1})$, from the training set 302.

In one implementation, the sequence model 310 is constructed as a hidden Markov model (HMM) to represent a whole sequence of strokes. Generally, the HMM is a probabilistic variant of a finite state machine used for temporal classification. The sequence of strokes corresponds to a particular factorization of the joint distribution of feature vectors and labels of the form $$p(t_1, \ldots, t_N, x_1, \ldots, x_N) = p(t_1) \prod_{n=2}^{N} p(t_n | t_{n-1}) \left[ \prod_{n=1}^{N} p(x_n | t_n) \right] \quad (2)$$

Given the HMM of Equation (2), the most probable sequence of stroke labels may be found by running the Viterbi algorithm, which is a dynamic programming technique having a cost that is linear with the number of strokes. The Viterbi algorithm efficiently solves the optimization problem $$\arg\max_{t_1,\ldots,t_N} p(t_1, \ldots, t_N, x_1, \ldots, x_N) = \quad (3)$$
$$\arg\max_{t_1,\ldots,t_N} p(t_1, \ldots, t_N | x_1, \ldots, x_N)$$

where the equivalence between the left and right sides of this equation comes from omitting the factor $p(x_1, \ldots, x_N)$, which is independent of the stroke labels $t_1, \ldots, t_N$.

In contrast to the classification model described with regard to FIG. 2, which generates the posterior probability $p(t_n|x_n)$, the HMM determines conditional densities $p(x_n|t_n)$. These distributions are related through Bayes' theorem $$p(x_n | t_n) = \frac{p(t_n | x_n) p(x_n)}{p(t_n)} \quad (4)$$

Substituting Equation (4) into Equation (2) and omitting factors that are independent of $\{t_n\}$ leads to $$p(t_1, \ldots, t_N, x_1, \ldots, x_N) \propto p(t_1) \prod_{n=2}^{N} p(t_n | t_{n-1}) \left[ \prod_{n=1}^{N} \frac{p(t_n | x_n)}{p(t_n)} \right] \quad (5)$$

Therefore, the predictions of the classification model of FIG. 2 can be used by scaling the predictions by the marginal class probabilities relating to a stroke being text. Applied in this way, the HMM sequence model 210 yields the most likely sequence of states given an observed sequence of strokes. Furthermore, by re-weighting the emission probabilities of Equation (5), the algorithm can be adjusted to provide better performance on text in exchange for a poorer performance of non-text, or vice versa. It should be understood that a model incorporating temporal context could be used independently of the stroke feature model component, although temporal context alone tend to yield less accuracy than the stroke feature model component.

Given the prediction $p(t_1, \ldots, t_N, x_1, \ldots, x_N)$ for a sequence of strokes, a decision may then be made to classify the stroke as text or non-text. In the illustrated example, the stroke 312 is designated as a non-text stroke, whereas the strokes 314 are designated as text.

Figure 4:
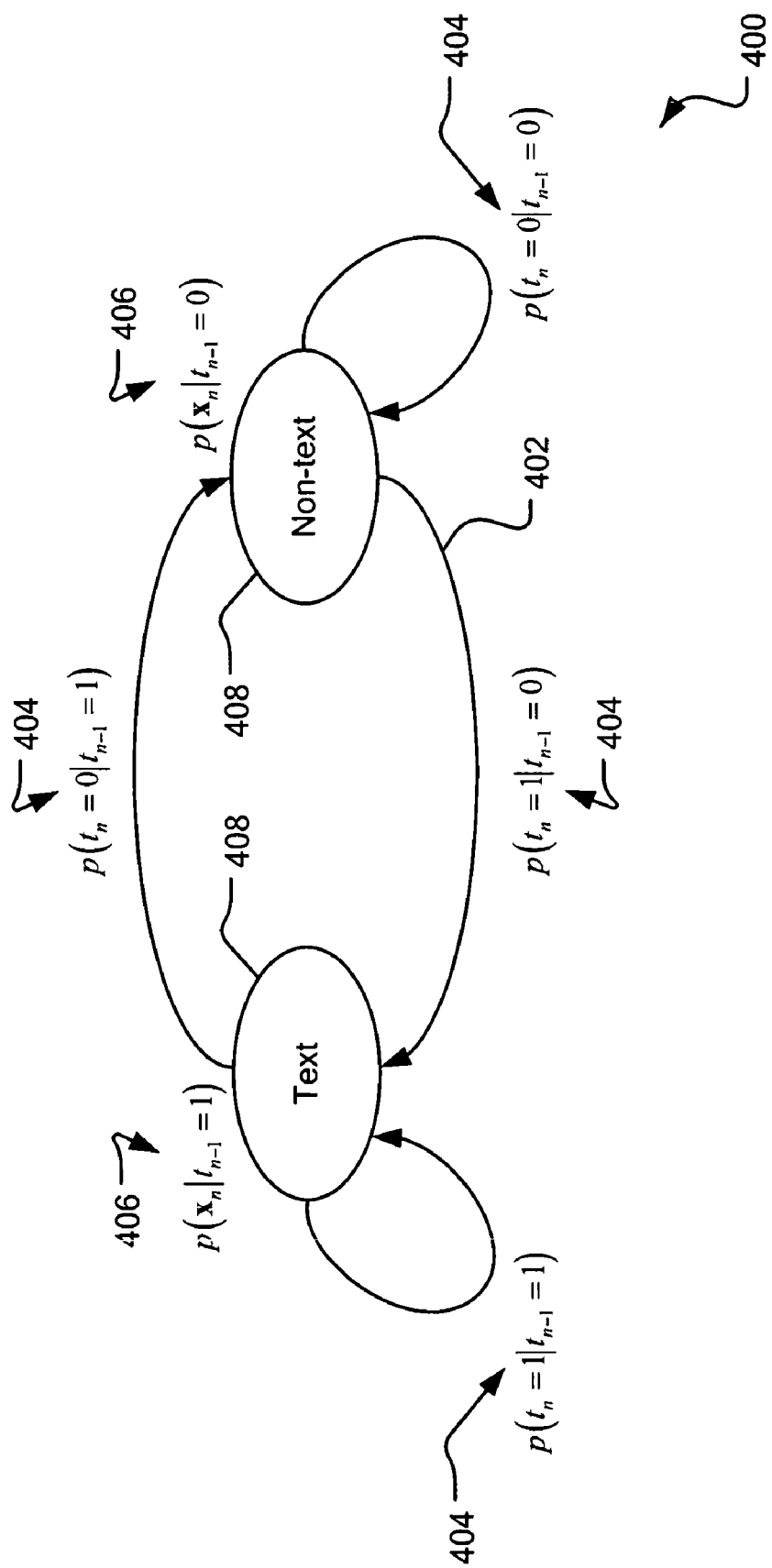
FIG. 4 illustrates an exemplary unipartite hidden Markov model.

FIG. 4 illustrates an exemplary unipartite hidden Markov model in the form of an HMM graph 400. The edges of the graph, such as edge 402, have been labeled with corresponding transition probabilities 404, such as those in Table 1. A transition probability represents a probability that the model will transition from one associated state to another. Each of the states 408 (i.e., "text" and "non-text") is labeled with an associated emission probability distribution 406 over stroke features (denoted as $p(x_n|\cdot)$). An emission probability distribution represents the probability that a vector of feature values is observed in a given state.

Figure 5:
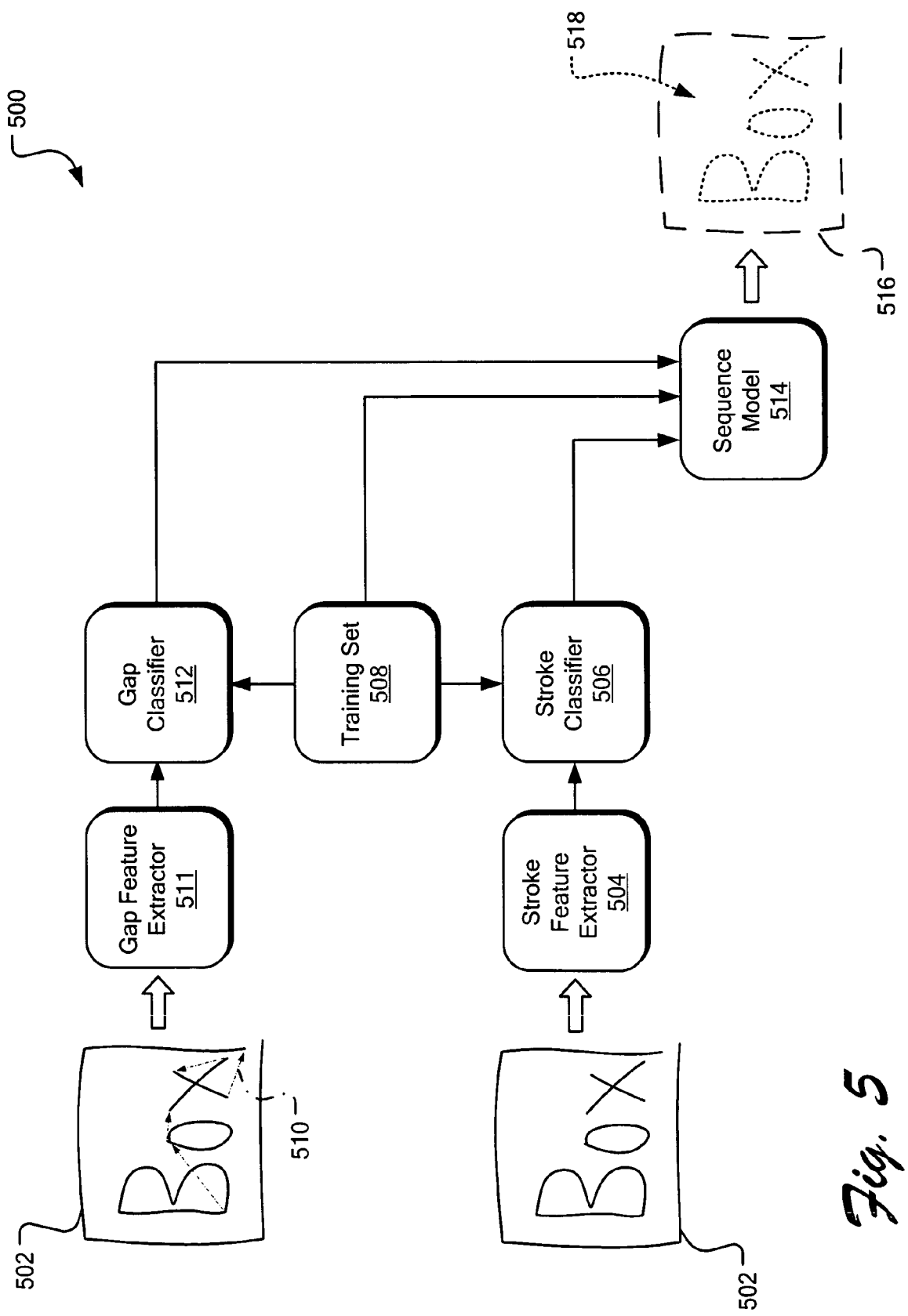
FIG. 5 illustrates an exemplary system for distinguishing between a text stroke and a non-text stroke using gaps between strokes.

FIG. 5 illustrates an exemplary system 500 for distinguishing between a text stroke and a non-text stroke using gaps between strokes. Stroke sequences from pen controlled devices also typically contain an additional source of information in the "gaps" between strokes. For example, a gap between two consecutive text strokes may have characteristics different from those of a gap between a text stroke and a non-text stroke. Intuitively, in many circumstances, the gaps between text strokes would likely be temporally more rapid and in closer spatial proximity than gaps between gaps between text strokes and non-text strokes.

As in FIGS. 2 and 3, a group of input strokes 502 are input to the computing system, typically through a digital ink application. A stroke extractor module 504 extracts one or more real-valued features from each stroke. A stroke classifier module 506 has access the training set 508 of N ordered strokes with feature vectors $x_n$, where n=1, ..., N, and class labels $t_n=\{0,1\}$, where $t_n=1$ denotes a text stoke and $t_n=0$ denotes a non-text stroke. Based on the training set 508, the stroke classifier module 506 generates a classification model used to classify the individual strokes. The stroke classifier module 506 generates the predictive distribution $p(t_n|x_n)$ of the classification model. The sequence model 514 extracts the transition probability $p(t_n|x_{n-1})$ from the training set 508.

In contrast to the systems shown in FIGS. 2 and 3, a gap extractor module 508 also receives the group of input strokes 502. The gap extractor module 508 evaluates the input strokes 502 for features z relating to gaps between strokes (which are represented by the small arrows, such as dashed arrow 510). In one implementation, the gaps are detected on the basis of coordinates of pen-up events and the following pen-down events, in combination with the pen-down times of the start of successive strokes, although the use of other information is possible.

A gap feature extractor module 511 extracts one or more real-valued features from each gap, including without limitation:
 1. the logarithm of the difference of pen-down times for surrounding strokes;
 2. the x- and y-differences of the pen-down locations for the surrounding strokes; and 3. the x- and y-differences of the pen-up location of the preceding stroke and the pen-down location of the following stroke.

Features 2 and 3 are normalized on a per page basis, by scaling the features with the inverse of the median fragment length. In addition, another variant of feature 1 may also be used, such that the logarithm of the difference of the pen-up time of the preceding stroke and the pen-down time of the following stroke. Other features may also be employed.

At least four labels are recognizable in association with gaps: text→text and non-text→non-text (collectively, "non-change gaps"), and text→non-text and non-text→text (collectively, "change gaps"). Using extracted gap features and labels, training data may be developed and input to the training set 508. Based on the training set 508, the gap classifier module 506 generates a classification model used to the individual gaps. The resulting model (e.g., LR or MLP) is integrated with a sequence model 514 in the form of a bi-partite HMM, which is represented by the graph in FIG. 6. It should be understood that a model incorporating gap features could be combined with any stoke prediction model.

$$p(t_1, \ldots, t_N, x_1, \ldots, x_N, z_1, \ldots, z_{N-1}) \propto \quad (6)$$

$$p(t_1) \prod_{n=2}^{N} p(t_n \mid t_{n-1}) \left[ \prod_{n=1}^{N} \frac{p(t_n \mid x_n)}{p(t_n)} \right] \left[ \prod_{n=1}^{N} \frac{p(t_n, t_{n+1} \mid z_n)}{p(t_n, t_{n+1})} \right]$$

Figure 6:
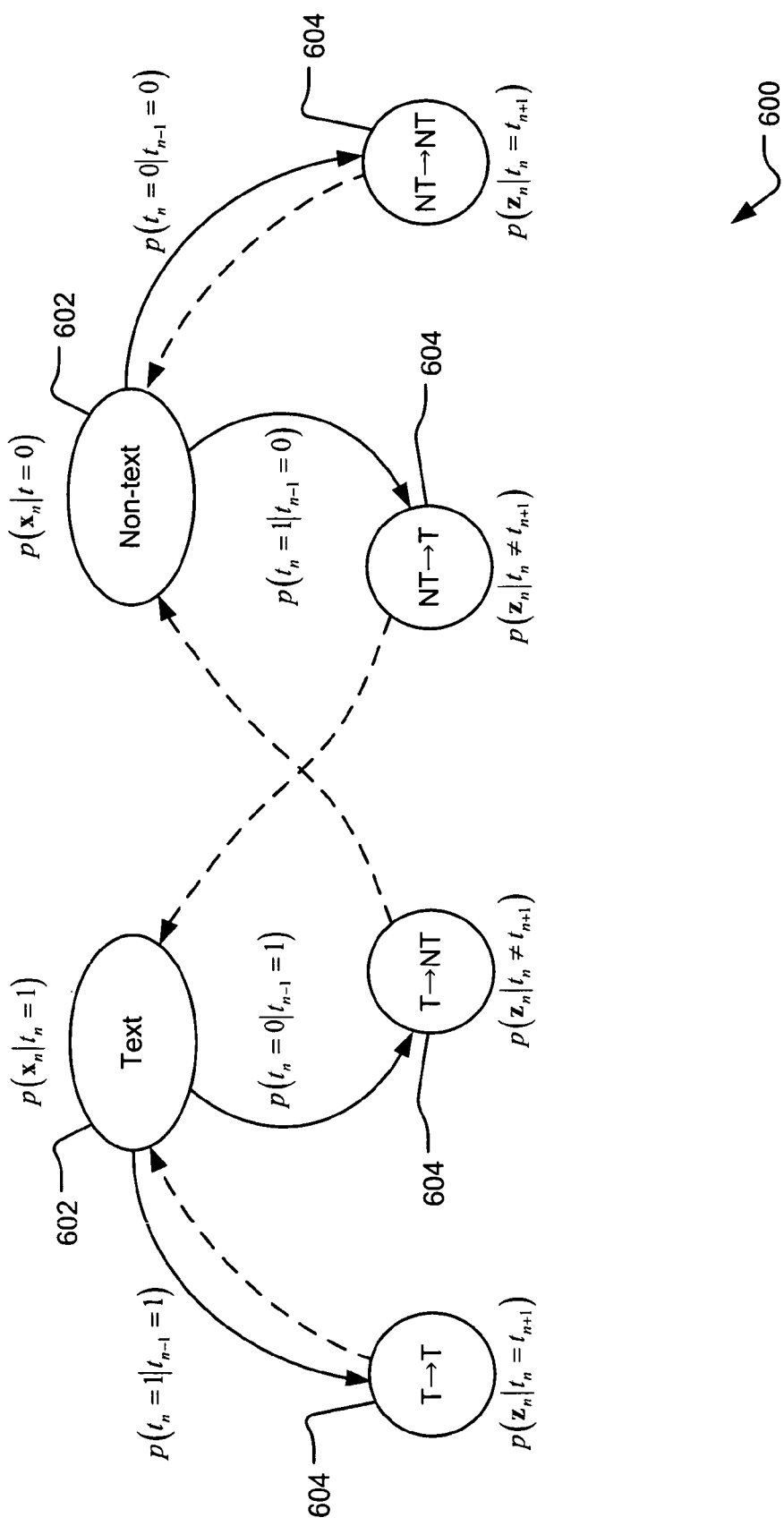
FIG. 6 illustrates an exemplary bipartite hidden Markov model.

FIG. 6 illustrates an exemplary bipartite hidden Markov model 600 in the form of an HMM graph 600. The bipartite hidden Markov model integrates gap and stroke classification models. The edges of the graph that transition from stroke states 602 to gap states 604 have been labeled with corresponding transition probabilities. As there is only one edge transition from each gap state 604, the transition probability for such edges (which are represented by dashed arrows) equals one. All states 602 and 604 are labeled with associated emission probabilities.

Figure 7:
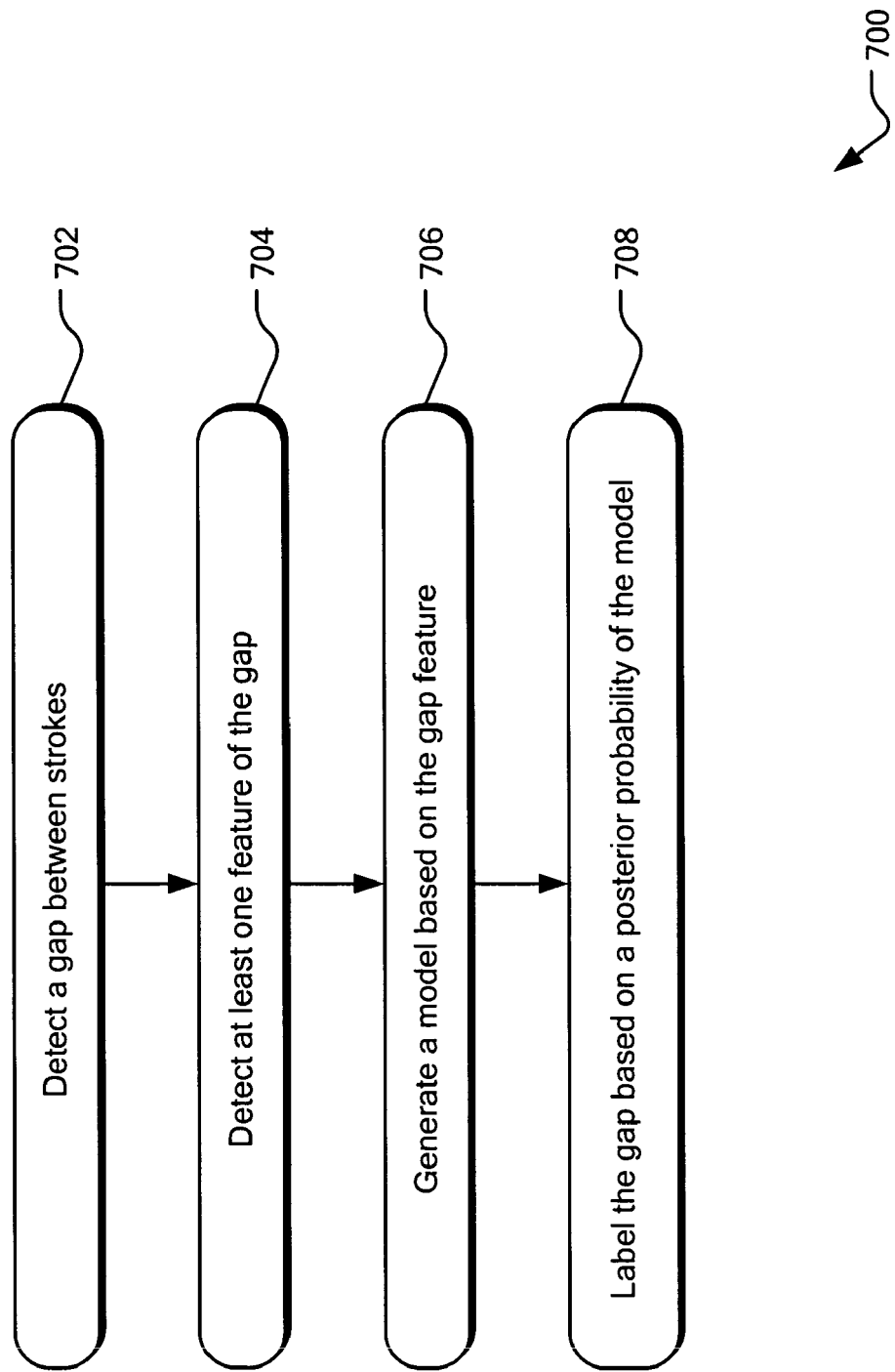
FIG. 7 illustrates exemplary operations for distinguishing between a text stroke and a non-text stroke based on gap features.

FIG. 7 illustrates exemplary operations 700 for distinguishing between a text stroke and a non-text stroke based on gap features. A detection operation 702 detects a gap between two strokes in digital ink. Another detection operation 704 detects one or more features of the detected gap. A modeling operation 706 evaluates a training set of stroke data to generate a classification model based on the gap features. A labeling operation 708 labels the gap based on the posterior probability of the model associated with the gap features. The labeling operation 708 may also be based on a posterior probability of the model associated with stroke features and on transition probabilities associated with proximal sequences of strokes.

Figure 8:
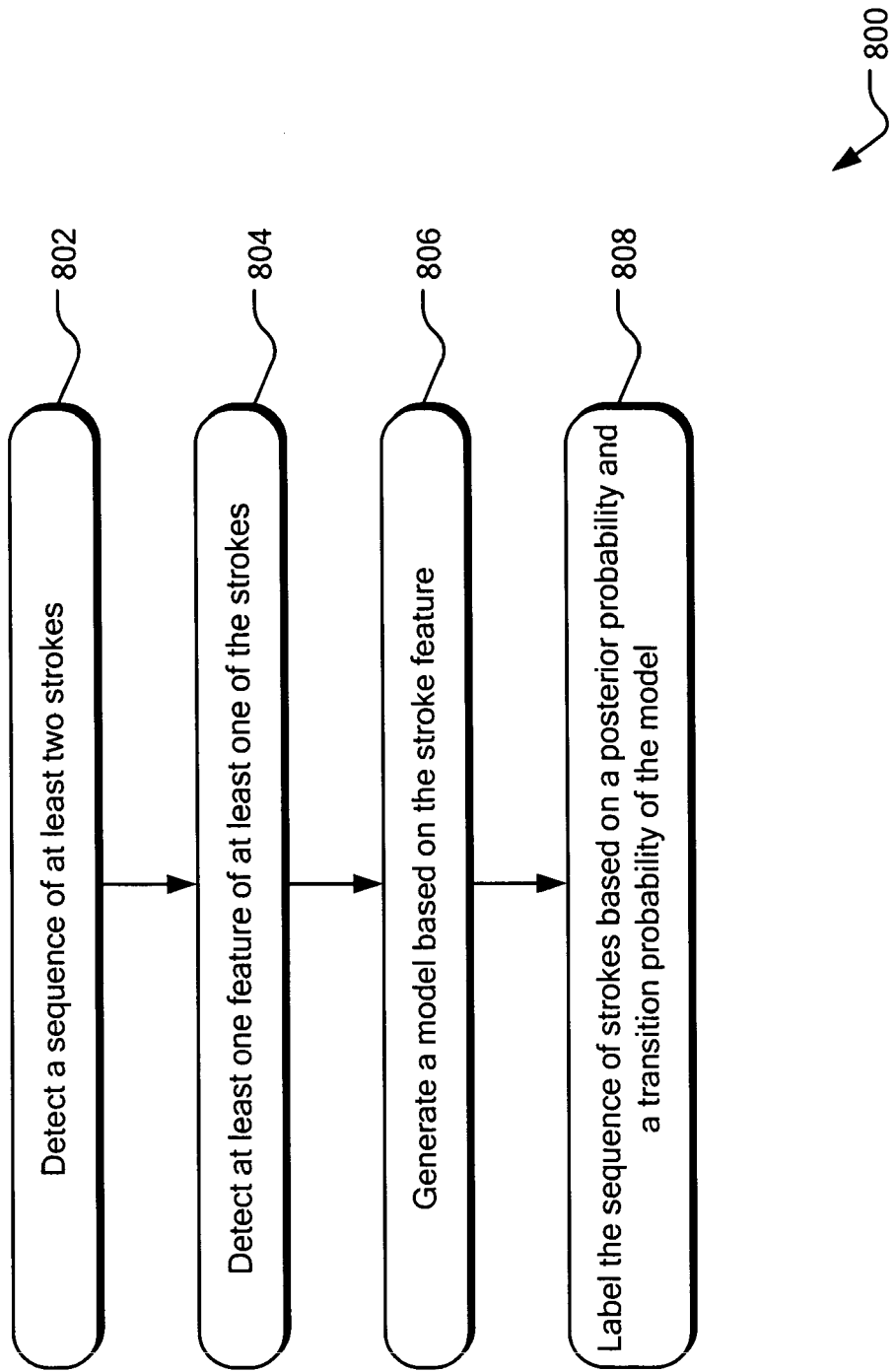
FIG. 8 illustrates exemplary operations for distinguishing between a text stroke and a non-text stroke based on temporal context and stroke features.

FIG. 8 illustrates exemplary operations 800 for distinguishing between a text stroke and a non-text stroke based on temporal context and stroke features. A detection operation 802 detects a sequence of at least two strokes in digital ink. Another detection operation 804 detects one or more features of the at least one of the strokes. A modeling operation 806 evaluates a training set of stroke data to generate a classification model based on the stroke features. A labeling operation 808 labels the stroke sequence based on the posterior probability of the model associated with the stroke features and on transition probabilities associated with sequences of strokes. The labeling operation 808 may also be based on a posterior probability of the model associated with gap features.

Figure 9:
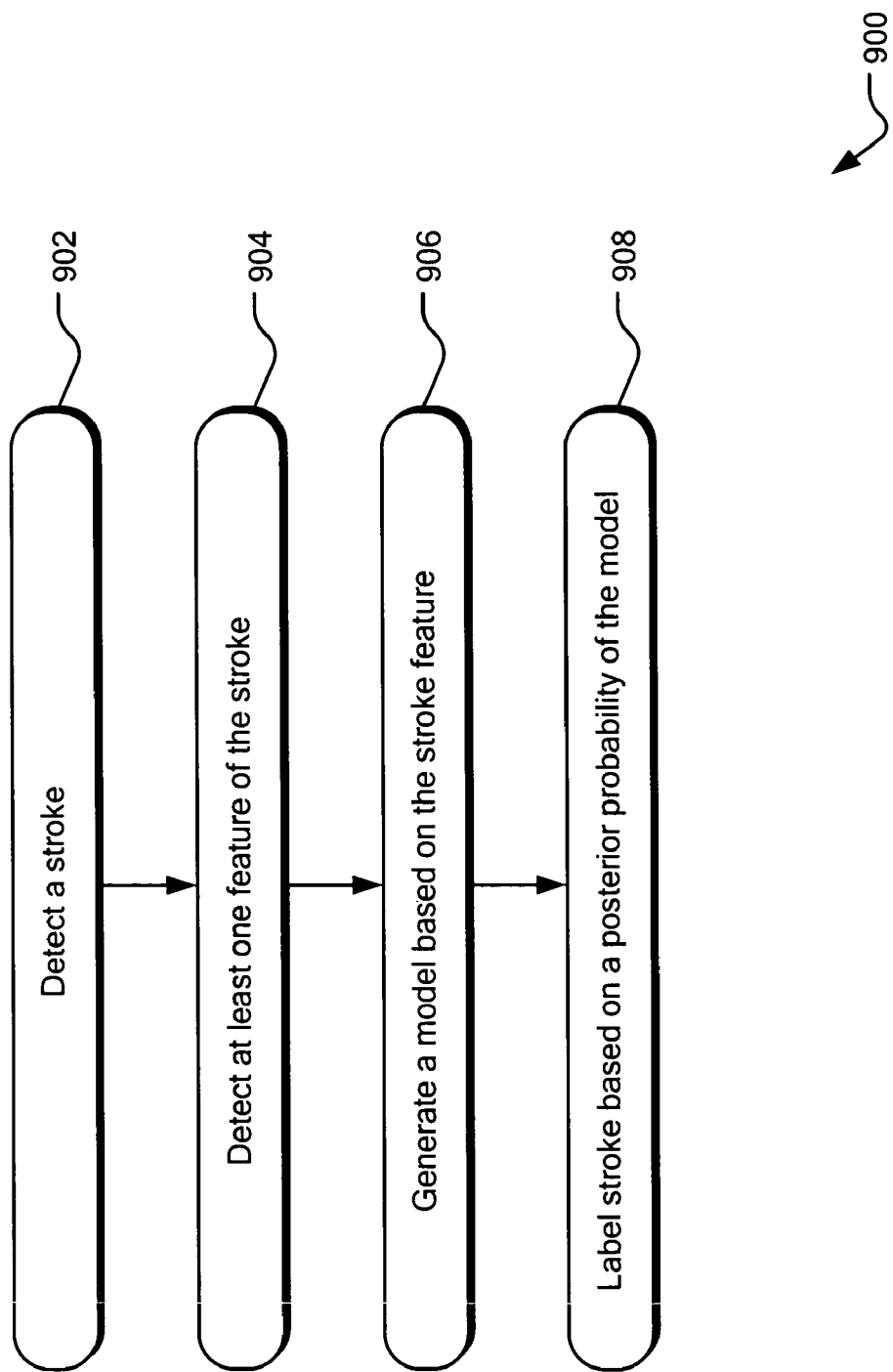
FIG. 9 illustrates exemplary operations for distinguishing between a text stroke and a non-text stroke based on stroke features.

FIG. 9 illustrates exemplary operations 900 for distinguishing between a text stroke and a non-text stroke based on stroke features. A detection operation 902 detects a stroke in digital ink. Another detection operation 904 detects one or more features of the detected stroke. A modeling operation 906 evaluates a training set of stroke data to generate a classification model based on the stroke features. A labeling operation 908 labels the stroke based on the posterior probability of the model associated with the stroke features.

The exemplary hardware and operating environment of FIG. 10 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a stroke feature extractor module, a stroke classifier module, a gap feature extractor module, a gap classifier module, and other modules may be incorporated as part of the operating system 35, application programs 36, or other program modules 37. Transition probabilities, emission probabilities, stroke features, gap features, labels, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of distinguishing between text strokes and non-text strokes in digital ink, the method comprising:
   detecting a stroke in the digital ink;
   generating a classification model based on at least one stroke feature of the stroke, wherein the model defines a posterior probability that the stroke is a text stroke;
   labeling the stroke as a text stroke or a non-text stroke based on the posterior probability; and
   detecting the at least one stroke feature of the stroke as a length-width ratio of a total least squares model fitted to the stroke in the digital ink.

2. The method of claim 1 further comprising:
   detecting the at least one stroke feature of the stroke as a stroke arc length of the stroke in the digital ink.

3. The method of claim 1 further comprising:
   detecting the at least one stroke feature of the stroke as a total absolute curvature of the stroke in the digital ink.

4. The method of claim 1 further comprising:
   detecting the at least one stroke feature of the stroke as a direction of the stroke in the digital ink.

5. The method of claim 1 further comprising:
   dividing the second stroke into fragments at points corresponding to local maxima in the curvature of the stroke; and
   detecting the at least one stroke feature of the second stroke as a total number of fragments of the stroke in the digital ink.

6. The method of claim 1 further comprising:
   dividing the stroke into fragments at points corresponding to local maxima in the curvature of the stroke; and
   detecting the at least one stroke feature of the stroke as an arc length of the largest fragment of the stroke in the digital ink.

7. The method of claim 1 further comprising:
   dividing the stroke into fragments at points corresponding to local maxima in the curvature of the stroke; and
   detecting the at least one stroke feature of the stroke as a total absolute curvature of the largest fragment of the stroke in the digital ink.

8. The method of claim 1 further comprising:
   dividing the stroke into fragments at points corresponding to local maxima in the curvature of the stroke; and
   detecting the at least one stroke feature of the stroke as a direction of the largest fragment of the stroke in the digital ink.

9. The method of claim 1 further comprising:
   dividing the stroke into fragments at points corresponding to local maxima in the curvature of the stroke; and
   detecting the at least one stroke feature of the stroke as a length of the long size of a rectangle bounding the largest fragment of the stroke in the digital ink.

10. A computer readable medium encoded with a computer program for distinguishing between text strokes and non-text strokes in digital ink, the computer process comprising:
    detecting a stroke in the digital ink;
    generating a classification model based on at least one stroke feature of the stroke, wherein the model defines a posterior probability that the stroke is a text stroke;
    labeling the stroke as a text stroke or a non-text stroke based on the posterior probability;
    dividing the stroke into fragments at points corresponding to local maxima in the curvature of the stroke; and
    detecting the at least one stroke feature of the stroke as a total absolute curvature of the largest fragment of the stroke in the digital ink.

11. The computer readable medium of claim 10 wherein the computer process further comprises:
    detecting the at least one stroke feature of the stroke as a stroke arc length of the stroke in the digital ink.

12. The computer readable medium of claim 10 wherein the computer process further comprises:
    detecting the at least one stroke feature of the stroke as a total absolute curvature of the stroke in the digital ink.

13. The computer readable medium of claim 10 wherein the computer process further comprises:
    detecting the at least one stroke feature of the stroke as a direction of the stroke in the digital ink.

14. The computer readable medium of claim 10 wherein the computer process further comprises:
    detecting the at least one stroke feature of the stroke as a length-width ratio of a total least squares model fitted to the stroke in the digital ink.

15. The computer readable medium of claim 10 wherein the computer process further comprises:
    dividing the stroke into fragments at points corresponding to local maxima in the curvature of the stroke; and
    detecting the at least one stroke feature of the stroke as a total number of fragments of the stroke in the digital ink.

16. The computer readable medium of claim 10 wherein the computer process further comprises:
    dividing the stroke into fragments at points corresponding to local maxima in the curvature of the stroke; and
    detecting the at least one stroke feature of the stroke as an arc length of the largest fragment of the stroke in the digital ink.

17. The computer readable medium of claim 10 wherein the computer process further comprises:
    dividing the stroke into fragments at points corresponding to local maxima in the curvature of the stroke; and
    detecting the at least one stroke feature of the stroke as a direction of the largest fragment of the stroke in the digital ink.

18. The computer program product of claim 10 wherein the computer process further comprises:
    dividing the stroke into fragments at points corresponding to local maxima in the curvature of the second stroke; and
    detecting the at least one stroke feature of the stroke as a length of the long size of a rectangle bounding the largest fragment of the stroke in the digital ink.

19. A system for distinguishing between text strokes and non-text strokes in digital ink, the system comprising:
    a stroke feature extractor module that detects a stroke in the digital ink; and
    a stroke classifier module that generates a classification model based on at least one stroke feature of the stroke, wherein the model defines a posterior probability that the stroke is a text stroke, and labels the stroke as a text stroke or a non-text stroke based on the posterior probability, the stroke feature extractor module being configured to divide the stroke into fragments at points corresponding to local maxima in the curvature of the stroke and detect the at least one stroke feature of the stroke as a total absolute curvature of the largest fragment of the stroke in the digital ink.

20. A method of distinguishing between text strokes and non-text strokes in digital ink, the method comprising:
    detecting a stroke in the digital ink;
    generating a classification model based on at least one stroke feature of the stroke, wherein the model defines a posterior probability that the stroke is a text stroke;
    labeling the stroke as a text stroke or a non-text stroke based on the posterior probability;
    dividing the stroke into fragments at points corresponding to local maxima in the curvature of the stroke; and
    detecting the at least one stroke feature of the stroke as a total absolute curvature of the largest fragment of the stroke in the digital ink.

21. A computer readable medium encoded with a computer program for distinguishing between text strokes and non-text strokes in digital ink, the computer process comprising:
    detecting a stroke in the digital ink;
    generating a classification model based on at least one stroke feature of the stroke, wherein the model defines a posterior probability that the stroke is a text stroke;
    labeling the stroke as a text stroke or a non-text stroke based on the posterior probability; and
    detecting the at least one stroke feature of the stroke as a length-width ratio of a total least squares model fitted to the stroke in the digital ink.

22. A system for distinguishing between text strokes and non-text strokes in digital ink, the system comprising:
    a stroke feature extractor module that detects a stroke in the digital ink; and
    a stroke classifier module that generates a classification model based on at least one stroke feature of the stroke, wherein the model defines a posterior probability that the stroke is a text stroke, and labels the stroke as a text stroke or a non-text stroke based on the posterior probability, the stroke feature extractor module being configured to detect the at least one stroke feature of the stroke as a length-width ratio of a total least squares model fitted to the stroke in the digital ink.

* * * * *